United States Patent

[11] 3,626,903

| [72] | Inventor | Carl Van Gilst<br>Goshen, Ind. |
|---|---|---|
| [21] | Appl. No. | 704,482 |
| [22] | Filed | Feb. 9, 1968 |
| [45] | Patented | Dec. 14, 1971 |
| [73] | Assignee | Bangor Punta Operations, Inc.<br>New York, N.Y. |

[54] ANIMAL PEN STRUCTURE
6 Claims, 18 Drawing Figs.

| [52] | U.S. Cl. | 119/20, 256/24 |
|---|---|---|
| [51] | Int. Cl. | A01k 1/02 |
| [50] | Field of Search | 119/20, 82; 256/24, 25, 26, 27 |

[56] References Cited
UNITED STATES PATENTS

| 1,441,724 | 1/1923 | Ferris | 256/25 |
|---|---|---|---|
| 2,675,783 | 4/1954 | Sears | 119/82 |
| 2,873,904 | 2/1959 | McCormick | 119/82 X |
| 3,002,493 | 10/1961 | Galamba | 119/20 |
| 3,020,023 | 2/1961 | MacIntyre et al. | 256/24 |
| 3,106,188 | 10/1963 | McMurray | 119/20 |
| 3,215,118 | 11/1965 | Behlen | 119/20 X |
| 3,240,475 | 3/1966 | Vegh | 256/27 |

*Primary Examiner*—Aldrich F. Medbery
*Attorneys*—Marmaduke A. Hobbs and Kemon, Palmer, Stewart and Estabrook ABSTRACT: A structure for pens for animals such as hogs, in which the panels are constructed of a plurality of horizontal members connected to one another by a single pinlike element to permit the panel to adjust to off-level surfaces. A postlike member is used to connect the ends of the panels to form pens of various configurations.

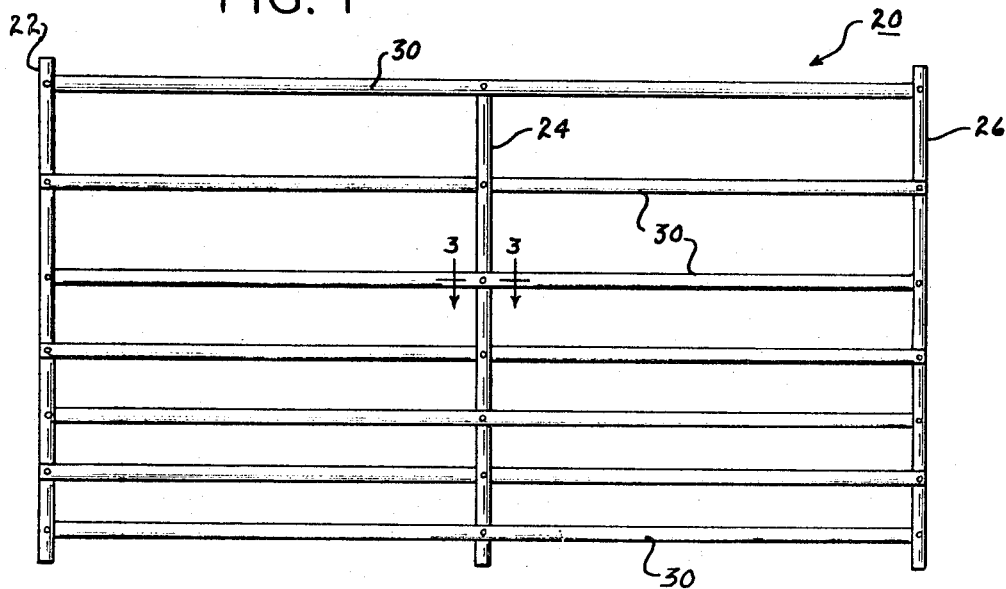
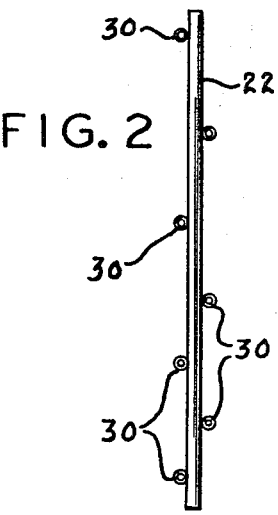
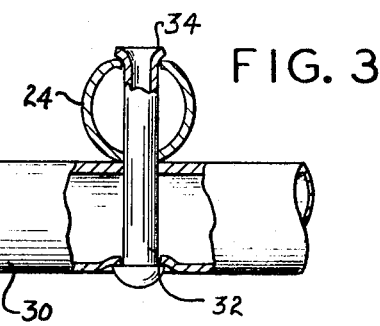
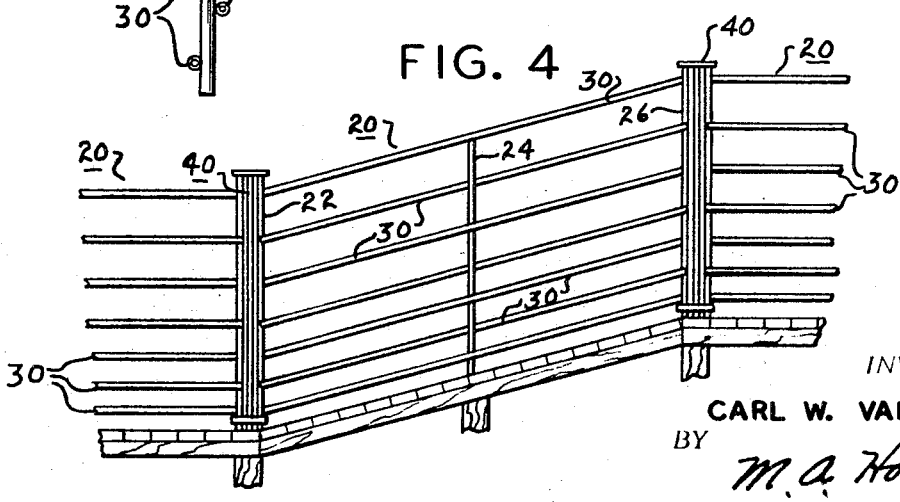
INVENTOR
CARL W. VAN GILST
BY M. A. Hobbs
ATTORNEY

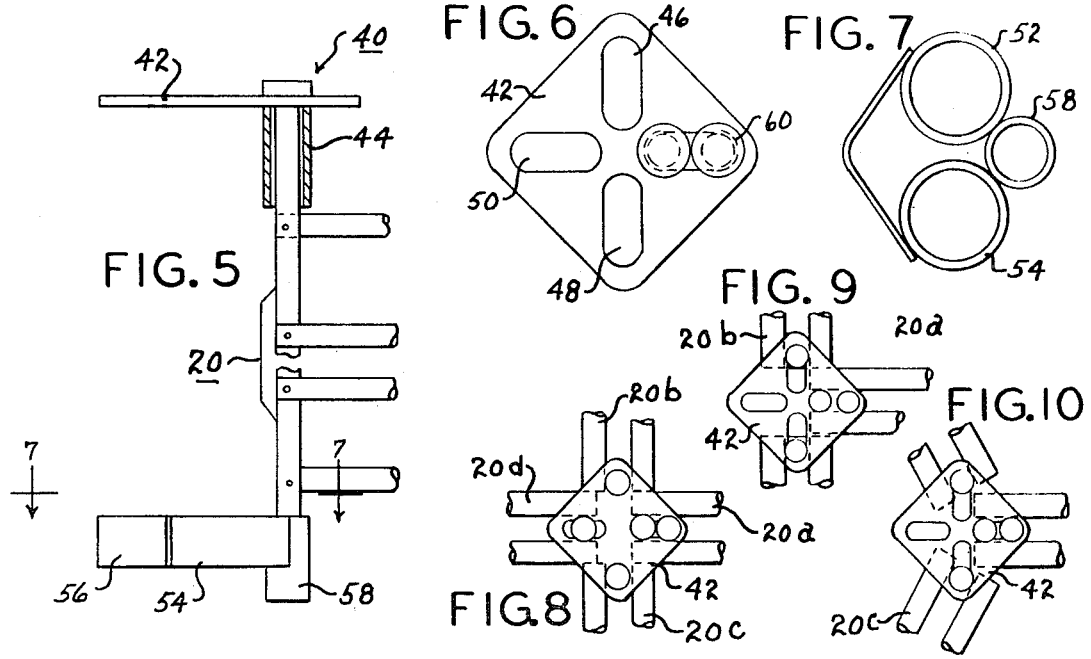

ANIMAL PEN STRUCTURE

Prefabricated pens for farm animals such as hogs are extensively used in agriculture, which permit the formation or construction of pens of various sizes and shapes. However, the conventional prefabricated pen often lacks the versatility and convenience necessary to adapt the structure to various ground or floor conditions. As a result, the assembly of the pen structures is difficult to make and the completed structure is often unreliable in retaining the animals in the pen or in a particular compartment of the pen complex. Further, the conventional prefabricated pen structure is either too weak to be reliable, too costly to fabricate, or too heavy to assembly readily and conveniently. It is therefore one of the principal objects of the present invention to provide a prefabricated modular pen structure for farm animals, which effectively and automatically adapts itself to uneven ground or floor conditions beneath the pen so that the lower edge of the side wall panels maintains a substantially uniform spacing above the ground or floor and which is relatively strong and light so that it can easily be assembled into various shapes and thereafter readily disassembled and moved to new locations.

Another object of the invention is to provide panels or sections for constructing hog pens and the like, which can be used for forming a variety of pen or compartment configurations and which have sufficient versatility or flexibility to permit the formation of an effective pen construction either in a building or out of doors, and which can readily be assembled into a pen arrangement and thereafter easily changed to other configurations or combined with existing pen structures to form additional pens and new configurations.

Still another object of the invention is to provide a self-adjusting panel for an animal pen which is simple in construction and operation and which can easily be fabricated from readily available metal tubular materials to form a structure having high resistance to lateral loads.

Additional objects and advantages of the invention will become apparent from the following description and accompanying drawings, wherein:

FIG. 1 is a side elevational view of a panel for use in constructing various pen configurations embodying the present invention;

FIG. 2 is an end elevational view of the panel structure shown in FIG. 1; FIG. 3 is an enlarged, fragmentary cross-sectional view of the panel shown in FIG. 1, the section being taken on line 3—3 of the latter figure;

FIG. 4 is an elevational view of several of the panels shown in the preceding figures connected together to form a pen structure;

FIG. 5 is a side elevational and partial cross-sectional view of a connector structure used to connect the panels shown in the preceding figures;

FIG. 6 is a top plan view of the connector shown in FIG. 5;

FIG. 7 is a horizontal cross-sectional view taken on line 7—7 of FIG. 5;

FIGS. 8, 9 and 10 are top plan views of the connector shown in FIG. 5 illustrating various panel arrangements for forming pen configurations, the adjacent ends of the various panels being shown in plan view;

FIG. 11 is a connector or bracket used in connecting the pen to a rigid wall or post structure;

FIG. 12 is a top plan view of the bracket shown in FIG. ;

FIG. 13 is a horizontal cross-sectional view taken on line 13—13 of FIG. 11;

FIG. 14 is a side elevational view of a post used in connecting the panels to form various pen configurations;

FIG. 15 is a top plan view of the post structure shown in FIG. 14; and

FIGS. 16, 17 and 18 are top plan views of the post shown in FIGS. 14 and 15, illustrating various arrangements for connecting the panels to the post structure to form various pen configurations.

Referring more specifically to the drawings and to FIGS. 1 through 4 in particular, numeral 20 designated generally a panel or section for use in constructing various pen configurations and embodying the present invention. The panel shown consists of three vertical posts 22, 24 and 26, and horizontal member 30. As shown in the drawings, seven horizontal members are used and the upper horizontal members are spaced further apart than the lower members. Various spacings and numbers of the horizontal members may be used depending upon the intended use of the pen formed by the panels. While two end posts and one intermediate post 22, 24 and 26 are shown, additional intermediate posts may be used or the one shown may be omitted.

In the structure, the horizontal members are placed alternately on opposite sides of the vertical posts, as illustrated in FIG. 2, to give greater lateral support to the panel. Both the posts and the horizontal members are preferably of tubular construction and the horizontal members are secured to each vertical post by a single rivet or bolt 32 preferably extending all the way through the member and post and being firmly secured therein either by a spread end 34 or other suitable securing means. With the use of the single rivet at each joint, the horizontal members are pivoted to the posts so that these members will pivot relative to the posts in the manner illustrated in FIG. 4. This permits the posts to remain vertical while the horizontal members are tilted to various angular positions parallel to uneven ground or floor structure, thus maintaining a substantially uniform distance between the ground and the lower horizontal member of the panel. With the posts remaining vertical, the adjacent post can easily be secured thereto by the connecting structures shown in FIGS. 5 through 18 regardless of the slope of the ground or floor beneath the positioned panel.

The connector 40 illustrated in FIGS. 5 through 10 consists of an upper plate 42 having a downwardly extending sleeve 44 secured to the underside thereof for receiving the upper end of one of the posts 22 or 26 of panel 20. The plate is provided with a plurality of holes 46, 48 and 50 for forming various pen configurations from the panels connected thereto. The lower ends of the end posts of the panel are supported by a fixture structure consisting of annular members 52 and 54 and angular member 56, all being integrally joined together and connected to upwardly extending vertically positioned sleeve 58 which receives the lower end of the panel post seated in sleeve 44. The various panel end posts are seated in annular members 52 and 54 or angular member 56 and are retained in place by pin 60 extending downwardly through the respective slot 46, 48 and 50 in upper plate 42. Various configurations can readily be made using connector 40. As illustrated in FIGS. 8 through 10, the ends of the various panels indicated by numerals 20a, 20b, 20c, and 20d, are connected to the connector and extend in the various directions to form the respective pens. The connectors shown in FIG. 4 are of the type illustrated in FIGS. 5 through 10.

FIGS. 11, 12 and 13 illustrate a bracket-type connector used in conjunction with a wall or permanent post. The bracket 70 consists of a plate 72 having laterally projecting member 74 with an opening 76 therein for receiving a pin similar to pin 60 for holding the upper end of the post. The lower end of the post is held by a fixture 78 secured to plate 72 and forming a recess 80 for receiving the lower end of the end post of the panel. The operation of the panel is the same as previously described herein, i.e. the panel is adapted to assume various angular and off-horizontal positions. The bracket can be secured to the wall or permanent post structure by any suitable means, such as studs or screws 82 and 84 extending through panel 72 into the wall.

In some installations, a rigid post is desirable, and FIGS. 14 through 18 illustrate one suitable type of rigid post. This post 90 consists of a vertical member 92 and upper plate 94 having four elongated holes 96, 98, 100 and 102 for receiving pins 60 which extend downwardly through the holes into the upper end of end posts 22 or 26 of the panel. The center member 92 is welded or otherwise rigidly secured to a base plate 104, which in turn is secured to a suitable base by a plurality of screws or bolts 106 extending downwardly through the base plate into the base. The lower end of each end post of panel 20 seats in a slot 108 of angular extending members 110 positioned beneath the respective holes 96, 98, 100 and 102, these angular members being connected to member 92 and plate 104 by welding or other suitable securing means. FIGS. 16, 17 and 18 illustrate different panel arrangements for forming various pen configurations, the panels being indicated by 120a, 120b, and 120c in each of the figures.

The various connectors and posts shown in FIGS. 5 through 18 may be used alone or in combination with one another to form the desired pen configurations. The panels and supporting posts, connectors and brackets may be made of any suitable metal such as galvanized or painted steel, aluminum or a combination of these metals. While the vertical posts and horizontal members forming the panels are preferably constructed of steel, they may be of other suitable materials. Further, the panels may be of different lengths and heights and the pens formed thereby normally are provided with a suitable gate construction, preferably utilizing the posts, brackets or connectors illustrated in the drawings in conjunction with a panel pivoted on the post, bracket or connector.

While several embodiments of this pen structure have been described and illustrated herein, various changes and modifications may be made without departing from the scope of the invention.

I claim:

1. A pen structure comprising a panel having a plurality of substantially vertical posts, a plurality of spaced horizontally arranged members disposed alternately on one side and the other of the vertical posts, means pivotally connecting said members to said posts to permit said members to rotate relative to said posts and to permit said panel to adjust to off-level surfaces while maintaining said posts and said horizontal members, respectively, parallel to each other, and connector means for connecting the ends of two panels to form sidewalls of a pen.

2. A pen structure as defined in claim 1 in which said posts and said horizontally arranged members are constructed of tubular material.

3. A pen structure as defined in claim 1 in which said pivot means is a single rivetlike element securing each of said horizontally arranged members to each of said vertical posts.

4. A pen structure as defined in claim 1 in which said plurality of posts include two posts positioned adjacent the ends of said horizontal members, and in which said connector means includes an upper horizontally arranged plate with a plurality of spaced openings there, a post for supporting said plate, and a pin extending downwardly through said openings into the upper ends of two of said posts.

5. A pen structure as defined in claim 4 in which said connector includes a fixture connected to said supporting post disposed near the base thereof beneath each of said holes for receiving the lower end of a panel post.

6. A panel for a pen structure comprising a plurality of spaced, vertical posts, and a plurality of spaced horizontally arranged members disposed alternately on one side and the other of the vertical posts, a single pinlike element pivotally connecting said members to said posts to permit said members to rotate relative to said posts and to permit said panel to adjust to off-level surfaces while maintaining said posts and said horizontal members, respectively, parallel to each other.

* * * * *